(12) United States Patent
Lee et al.

(10) Patent No.: US 10,447,988 B2
(45) Date of Patent: Oct. 15, 2019

(54) STEREOSCOPIC IMAGE DISPLAY

(71) Applicant: LG DISPLAY CO., LTD., Seoul (KR)

(72) Inventors: Byungjoo Lee, Seoul (KR); Youyong Jin, Seoul (KR)

(73) Assignee: LG DISPLAY CO., LTD., Seoul (KR)

(*) Notice: Subject to any disclaimer, the term of this patent is extended or adjusted under 35 U.S.C. 154(b) by 192 days.

(21) Appl. No.: 15/824,614

(22) Filed: Nov. 28, 2017

(65) Prior Publication Data
US 2018/0152689 A1 May 31, 2018

(30) Foreign Application Priority Data
Nov. 29, 2016 (KR) .................. 10-2016-0160632

(51) Int. Cl.
| | |
|---|---|
| *H04N 13/00* | (2018.01) |
| *G02B 27/22* | (2018.01) |
| *G09G 5/14* | (2006.01) |
| *H04N 13/128* | (2018.01) |
| *H04N 13/305* | (2018.05) |
| *H04N 13/144* | (2018.01) |
| *H04N 13/133* | (2018.01) |
| *H04N 13/31* | (2018.01) |
| *H04N 13/398* | (2018.01) |
| *G09G 3/20* | (2006.01) |

(Continued)

(52) U.S. Cl.
CPC ....... *H04N 13/128* (2018.05); *G02B 27/2214* (2013.01); *G09G 3/2003* (2013.01); *G09G 3/342* (2013.01); *G09G 5/14* (2013.01); *H04N 13/133* (2018.05); *H04N 13/144* (2018.05); *H04N 13/305* (2018.05); *H04N 13/31* (2018.05); *H04N 13/317* (2018.05); *H04N 13/398* (2018.05); *G09G 2320/0613* (2013.01); *G09G 2320/0673* (2013.01); *G09G 2340/14* (2013.01)

(58) Field of Classification Search
None
See application file for complete search history.

(56) References Cited

U.S. PATENT DOCUMENTS

| | | | | | |
|---|---|---|---|---|---|
| 6,064,424 | A | * | 5/2000 | van Berkel | G02B 27/2214 348/51 |
| 6,703,989 | B1 | * | 3/2004 | Harrold | G02B 27/2214 345/32 |

(Continued)

FOREIGN PATENT DOCUMENTS

GB 2415850 A * 1/2006 ........... H04N 13/324

*Primary Examiner* — Mohammed Jebari
(74) *Attorney, Agent, or Firm* — Birch, Stewart, Kolasch & Birch, LLP

(57) ABSTRACT

A stereoscopic image display can include an optical cell and a display panel including pixels defined by first and second short sides extended in a first direction, and first and second long sides extended in a second direction perpendicular to the first direction; and apertures defined by first and second sides parallel to the first long side, and third and fourth sides parallel to each other, in which the third side is inclined with a first predetermined angle between the first short side and the third side, the fourth side is inclined with a second predetermined angle between the first long side and the third side, a ratio of a length of the first short side to a length of the first long side is 1:2, and a ratio of a length of the first side to a length of the first long side is 1:2.

18 Claims, 14 Drawing Sheets

(51) Int. Cl.
*G09G 3/34* (2006.01)
*H04N 13/317* (2018.01)

(56) References Cited

U.S. PATENT DOCUMENTS

| | | | | |
|---|---|---|---|---|
| 7,969,463 | B2* | 6/2011 | Takaki | G02B 27/2214 348/59 |
| 9,554,124 | B1* | 1/2017 | Owurowa | G02B 27/2214 |
| 2006/0114561 | A1* | 6/2006 | Mashitani | H04N 13/31 359/464 |
| 2006/0227208 | A1* | 10/2006 | Saishu | H04N 13/31 348/51 |
| 2007/0188517 | A1* | 8/2007 | Takaki | G02B 27/2214 345/613 |
| 2008/0218855 | A1* | 9/2008 | Van Berkel | H04N 13/305 359/463 |
| 2009/0102916 | A1* | 4/2009 | Saishu | H04N 13/31 348/54 |
| 2010/0309296 | A1* | 12/2010 | Harrold | G02B 27/2214 348/54 |
| 2011/0181706 | A1* | 7/2011 | Harrold | H04N 13/398 348/51 |
| 2012/0113100 | A1* | 5/2012 | Niioka | G02B 27/2214 345/419 |
| 2012/0229456 | A1* | 9/2012 | Takahashi | H04N 13/324 345/419 |
| 2012/0249530 | A1* | 10/2012 | Fukushima | G02B 27/2214 345/419 |
| 2012/0268481 | A1* | 10/2012 | Niioka | H04N 13/317 345/619 |
| 2013/0050815 | A1* | 2/2013 | Fukushima | G02B 3/005 359/462 |
| 2014/0009463 | A1* | 1/2014 | Watanabe | H04N 13/315 345/419 |
| 2014/0022619 | A1* | 1/2014 | Woodgate | G02B 27/2214 359/240 |
| 2014/0036047 | A1* | 2/2014 | Watanabe | G02B 27/2214 348/54 |
| 2014/0071181 | A1* | 3/2014 | Mishima | H04N 13/349 345/690 |
| 2014/0152927 | A1* | 6/2014 | Watanabe | G02B 27/2214 349/15 |
| 2014/0192047 | A1* | 7/2014 | Mishima | H04N 13/305 345/419 |
| 2015/0015681 | A1* | 1/2015 | Kim | G02B 27/2214 348/51 |
| 2015/0362740 | A1* | 12/2015 | Hamagishi | G02B 27/2214 348/44 |
| 2017/0307898 | A1* | 10/2017 | Vdovin | G02B 27/2214 |

* cited by examiner

STEREOSCOPIC IMAGE DISPLAY

This application claims the priority benefit of Korean Patent Application No. 10-2016-0160632 filed in the Republic of Korea on Nov. 29, 2016, which is incorporated herein by reference for all purposes as if fully set forth herein.

BACKGROUND OF THE INVENTION

Field of the Invention

The present disclosure relates to a stereoscopic image display.

Discussion of the Related Art

A stereoscopic image display implements a stereoscopic image using a stereoscopic technique or an autostereoscopic technique. The stereoscopic technique, which uses a parallax image between user's left and right eyes with a high stereoscopic effect, may include a glasses method and a glasses-free method, both of which have been put to practical use. In the glasses method, a parallax image between left and right eyes is displayed on a direct-view display or a projector through a change in a polarization direction of the left and right parallax image, and a stereoscopic image is implemented using polarized glasses. Alternatively, the parallax image between the left and right eyes is displayed on the direct-view display or the projector through in a time-division manner, and the stereoscopic image is implemented using shutter glasses. In the glasses-free method, a parallax image between left and right eyes is separated using an optical plate such as a parallax barrier and a lenticular sheet, and a stereoscopic image is implemented.

The glasses-free method is applied to small and medium-sized displays such as smartphones, tablets, and notebooks because of the convenience of the glasses-free method in which the user can view the stereoscopic image without wearing the shutter glasses or the polarized glasses. Pivotable smartphones or pivotable tablets, which can allow the user to view a video or an image in a landscape view (see FIG. 1A) and a portrait view (see FIG. 1B), have been recently developed.

FIG. 2A schematically illustrates an example of a method of implementing a stereoscopic image using the glasses-free method when a landscape view of a smartphone or a tablet is performed as shown in FIG. 1A. As shown in FIG. 2A, when the landscape view of the smartphone or the tablet is performed, pixels of the smartphone or the tablet are arranged so that a short axis of each pixel is disposed in an X-axis direction and a long axis of each pixel is disposed in a Y-axis direction. As shown in FIG. 2A, a lens for implementing the stereoscopic image is formed for every two pixels based on the short axis of each pixel. The lens refracts a left eye image L to the user's left eye and refracts a right eye image R to the user's right eye, and thus the user can view a stereoscopic image by binocular disparity.

FIG. 2B schematically illustrates an example of a method of implementing a stereoscopic image using the glasses-free method when a portrait view of a smartphone or a tablet is performed as shown in FIG. 1B. As shown in FIG. 2B, when the portrait view of the smartphone or the tablet is performed, pixels of the smartphone or the tablet are arranged so that a short axis of each pixel is disposed in the Y-axis direction and a long axis of each pixel is disposed in the X-axis direction. As shown in FIG. 2B, a lens for implementing the stereoscopic image is formed for every two pixels based on the long axis of each pixel. The lens refracts a left eye image L to the user's left eye and refracts a right eye image R to the user's right eye, and thus the user can view a stereoscopic image by binocular disparity.

A focal length "f" of the lens implementing the stereoscopic image is inversely proportional to a width "w" of the lens. As shown in FIG. 2A, when the lens is formed for every two pixels based on the short axis of each pixel, the width "w" of the lens equals a sum 2s of short axis lengths "s" of the two pixels. As shown in FIG. 2B, when the lens is formed for every two pixels based on the long axis of each pixel, the width "w" of the lens equals a sum 2l of long axis lengths "l" of the two pixels. The focal length "f" of the lens when the width "w" of the lens equals the sum 2s of the short axis lengths "s" of the two pixels as shown in FIG. 2A is longer than the focal length "f" of the lens when the width "w" of the lens equals the sum 2l of the long axis lengths "l" of the two pixels as shown in FIG. 2B.

In other words, the focal length "f" of the lens differs between the landscape view and the portrait view of the smartphone or the tablet. Therefore, when the user pivots the smartphone or the tablet, a stereoscopic viewing distance "d" at which the user can optimally view the smartphone or the tablet is changed. Thus, when the user pivots the smartphone or the tablet, the user feels a 3D crosstalk, in which the left eye image L and the right eye image R overlap with each other, until the user finds the optimal stereoscopic viewing distance "d."

SUMMARY OF THE INVENTION

The present disclosure relates to a stereoscopic image display capable of allowing a user to view a stereoscopic image without changing an optimal viewing position even when the user performs a pivoting operation.

In one aspect, there is provided a stereoscopic image display including a display panel and an optical cell on the display panel, in which the display panel includes pixels, each of which is defined by first and second short sides extended in a first direction and first and second long sides extended in a second direction perpendicular to the first direction, and apertures, each of which is included inside each pixel and is defined by first and second sides parallel to the first long side and third and fourth sides that are inclined from the first short side and the first long side by a predetermined angle and are parallel to each other, in which a ratio of lengths of the first short side and the first long side is set to 1:2, in which a ratio of lengths of the first side and the first long side is set to 1:2, and a ratio of lengths of the second side and the first long side is set to 1:2.

The predetermined angle is 45° according to an embodiment.

According to an embodiment, each pixel has a first point where the first short side and the first long side meet each other and a second point where the second short side and the second long side meet each other. The third side contacts with a first reference line that traverses the first point and a middle of the second long side. The fourth side contacts with a second reference line that traverses a middle of the first long side and the second point.

According to an embodiment, each pixel has a first point where the first short side and the first long side meet each other and a second point where the second short side and the second long side meet each other. Each aperture includes a first vertex at which the first side and the third side meet each other, a second vertex at which the second side and the fourth side meet each other, a third vertex at which the first side and the fourth side meet each other, and a fourth vertex at which the second side and the third side meet each other. The first vertex is positioned on a first reference line that traverses the first point and a middle of the second long side, and the third vertex is positioned on a second reference line that traverses a middle of the first long side and the second point. The fourth vertex and the second vertex are respectively spaced apart from the first reference line and the second reference line by a predetermined distance.

According to an embodiment, each pixel has a first point where the first short side and the first long side meet each other and a second point where the second short side and the second long side meet each other. Each aperture includes a first vertex at which the first side and the third side meet each other, a second vertex at which the second side and the fourth side meet each other, a third vertex at which the first side and the fourth side meet each other, and a fourth vertex at which the second side and the third side meet each other. The fourth vertex is positioned on a first reference line that traverses the first point and a middle of the second long side, and the second vertex is positioned on a second reference line that traverses a middle of the first long side and the second point. The first vertex and the third vertex are respectively spaced apart from the first reference line and the second reference line by a predetermined distance.

According to an embodiment, each pixel has a first point where the first short side and the first long side meet each other and a second point where the second short side and the second long side meet each other. Each aperture includes a first vertex at which the first side and the third side meet each other and a second vertex at which the second side and the fourth side meet each other. The first vertex is positioned on a first tilting line perpendicular to a first reference line that traverses the first point and a middle of the second long side. The second vertex is positioned on a second tilting line perpendicular to a second reference line that traverses a middle of the first long side and the second point.

A distance between the first vertex and a center of the pixel is equal to a distance between the second vertex and the center of the pixel according to an embodiment.

Portions of the aperture beyond the first and second reference lines can have the same area.

The first long side and the first side are spaced apart from each other by a predetermined distance, and the second long side and the second side are spaced apart from each other by a predetermined distance.

The aperture can have a parallelogram shape.

The optical cell includes a stereoscopic image unit that is extended in parallel with the third and fourth sides and has a width corresponding to widths of n successively arranged apertures, where "n" is a natural number equal to or greater than 2. The width of the aperture equals a distance between the third side and the fourth side.

In a first mode (e.g., landscape mode), the first and second short sides are arranged in the first direction, and the first and second long sides are arranged in the second direction. In a second mode (e.g., portrait mode), the first and second long sides are arranged in the first direction, and the first and second short sides are arranged in the second direction. An optimal viewing distance of a stereoscopic image is the same in the first mode and the second mode.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

The terms "first," "second," etc. may be used to describe various components, but the components are not limited by such term's. The terms are used only for the purpose of distinguishing one component from other components. For example, a first component may be designated as a second component, and vice versa, without departing from the scope of the present disclosure.

In describing various embodiments, the same components are described at the outset and description thereof may be omitted in other embodiments.

Figure 1A:
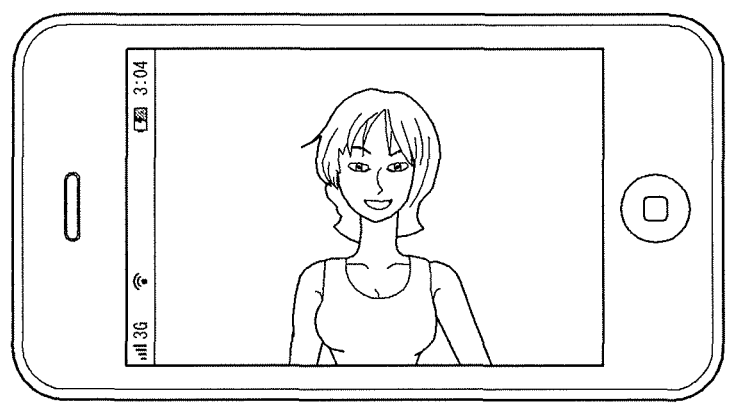
FIGS. 1A and 1B illustrate a pivoting function of a smartphone or a tablet according to a related art.
Figure 1B:
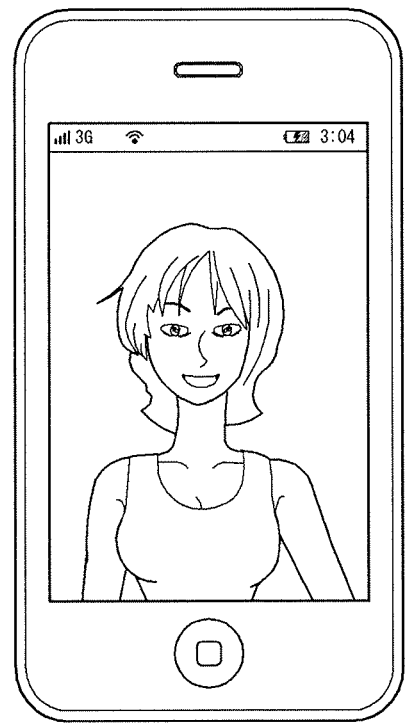
Figure 2A:
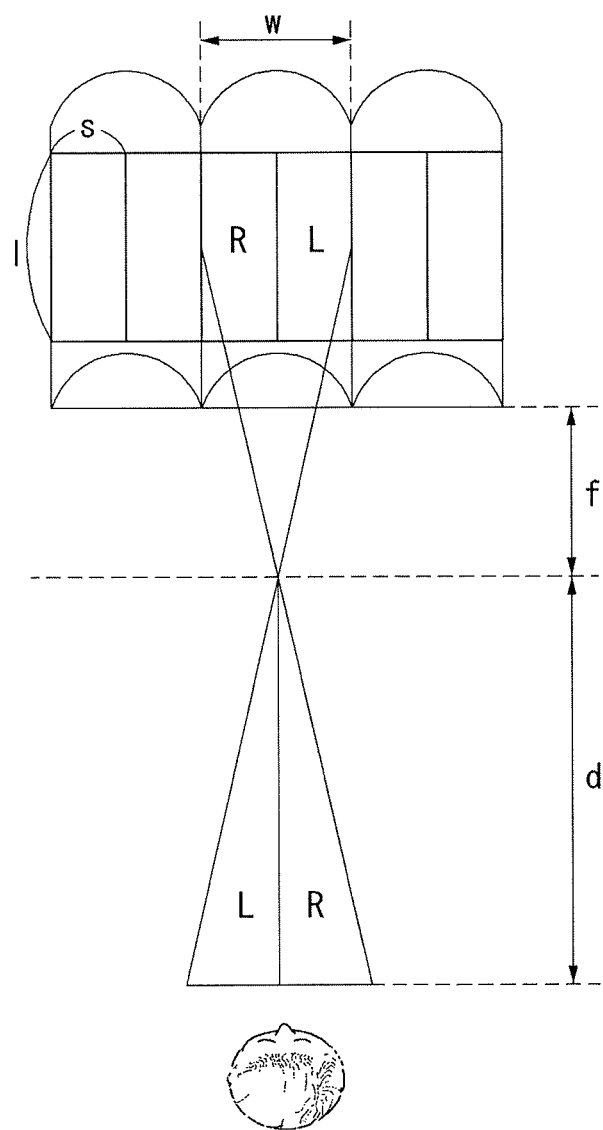
FIG. 2A schematically illustrates an example of a method of implementing a stereoscopic image using a glasses-free method when a landscape view of a smartphone or a tablet is performed as shown in FIG. 1A.
Figure 2B:
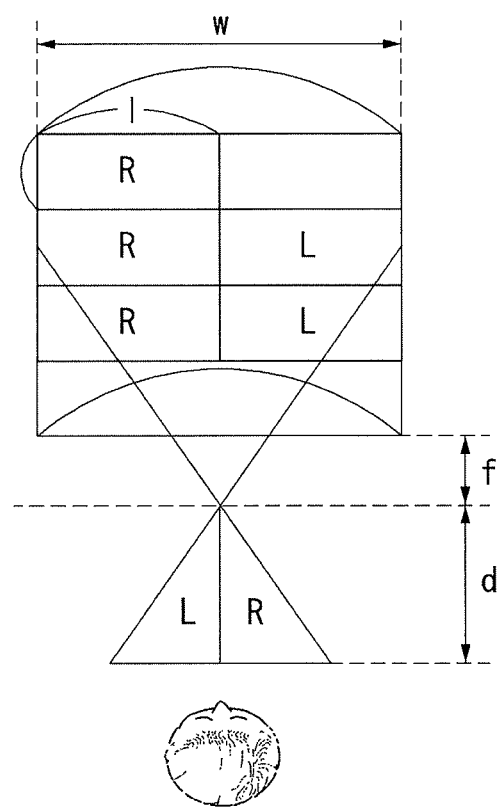
FIG. 2B schematically illustrates an example of a method of implementing a stereoscopic image using a glasses-free method when a portrait view of a smartphone or a tablet is performed as shown in FIG. 1B.
Figure 3:
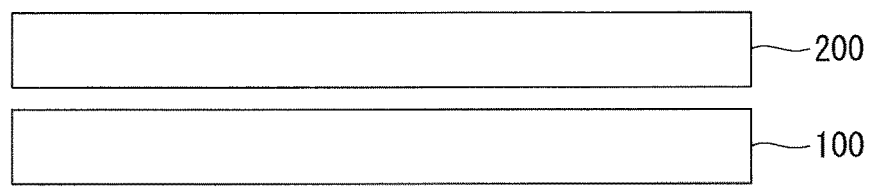
FIG. 3 is a cross-sectional view schematically illustrating a stereoscopic image display according to an embodiment of the disclosure.
Figure 4:
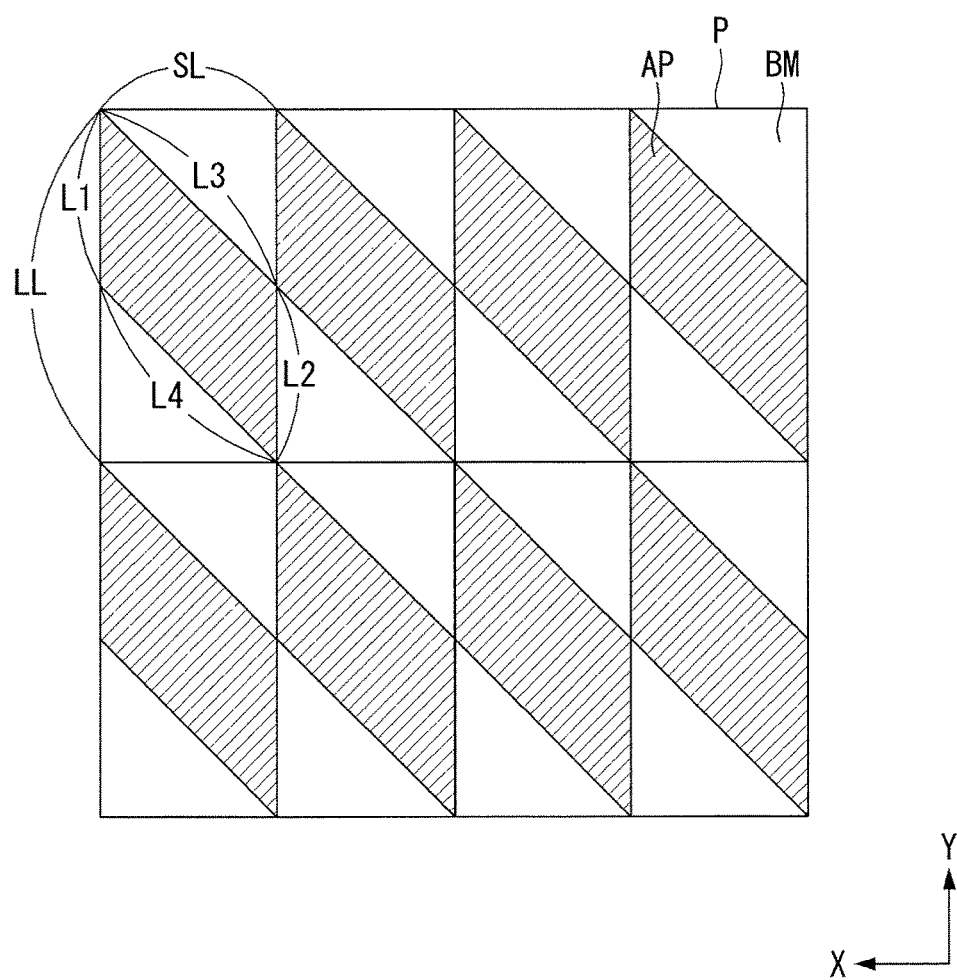
FIGS. 4 and 5 illustrate a relationship between a pixel and an aperture according to an embodiment of the disclosure.
Figure 5:
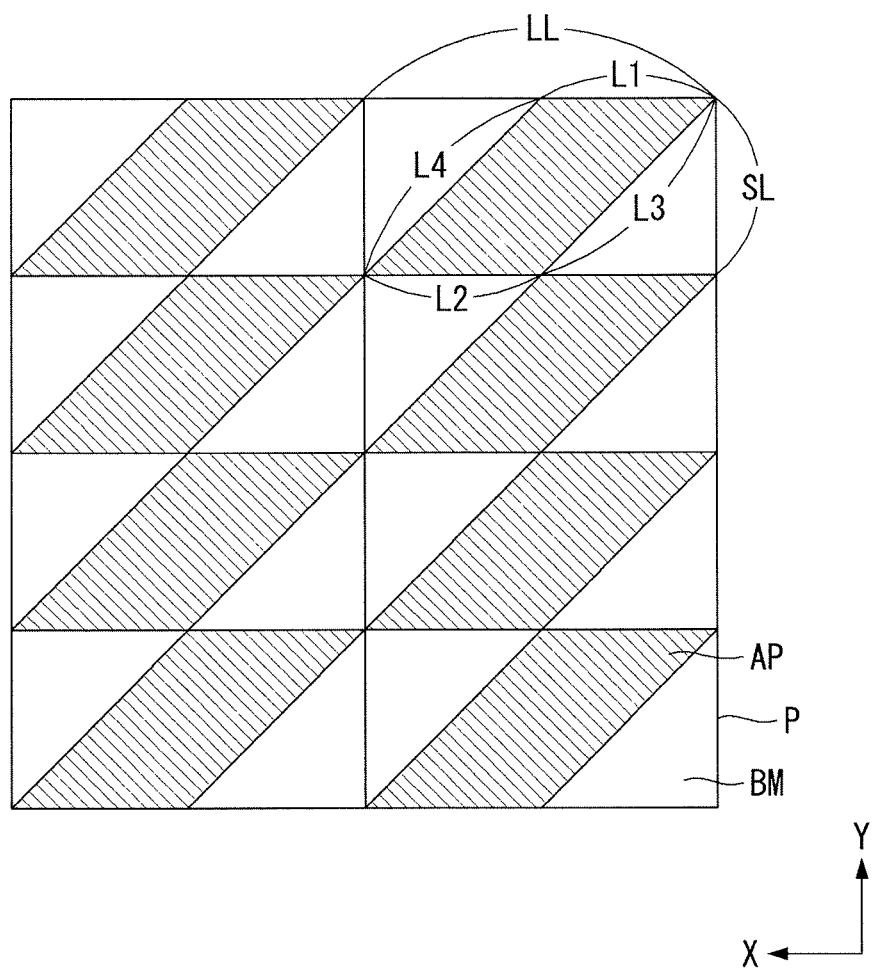
Figure 6:
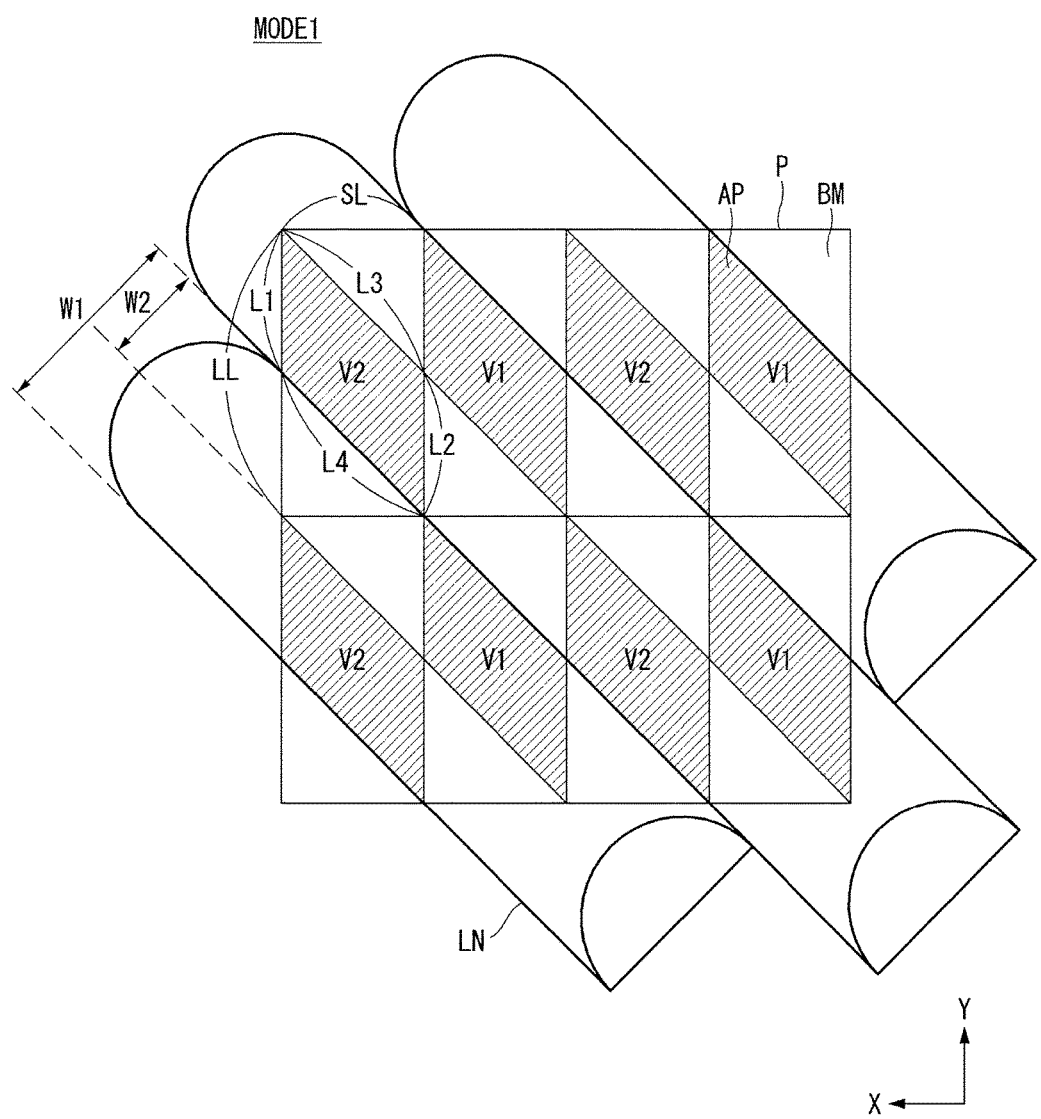
FIG. 6 illustrates a relationship between a display panel and an optical cell in a first mode according to an embodiment of the disclosure.
Figure 7:
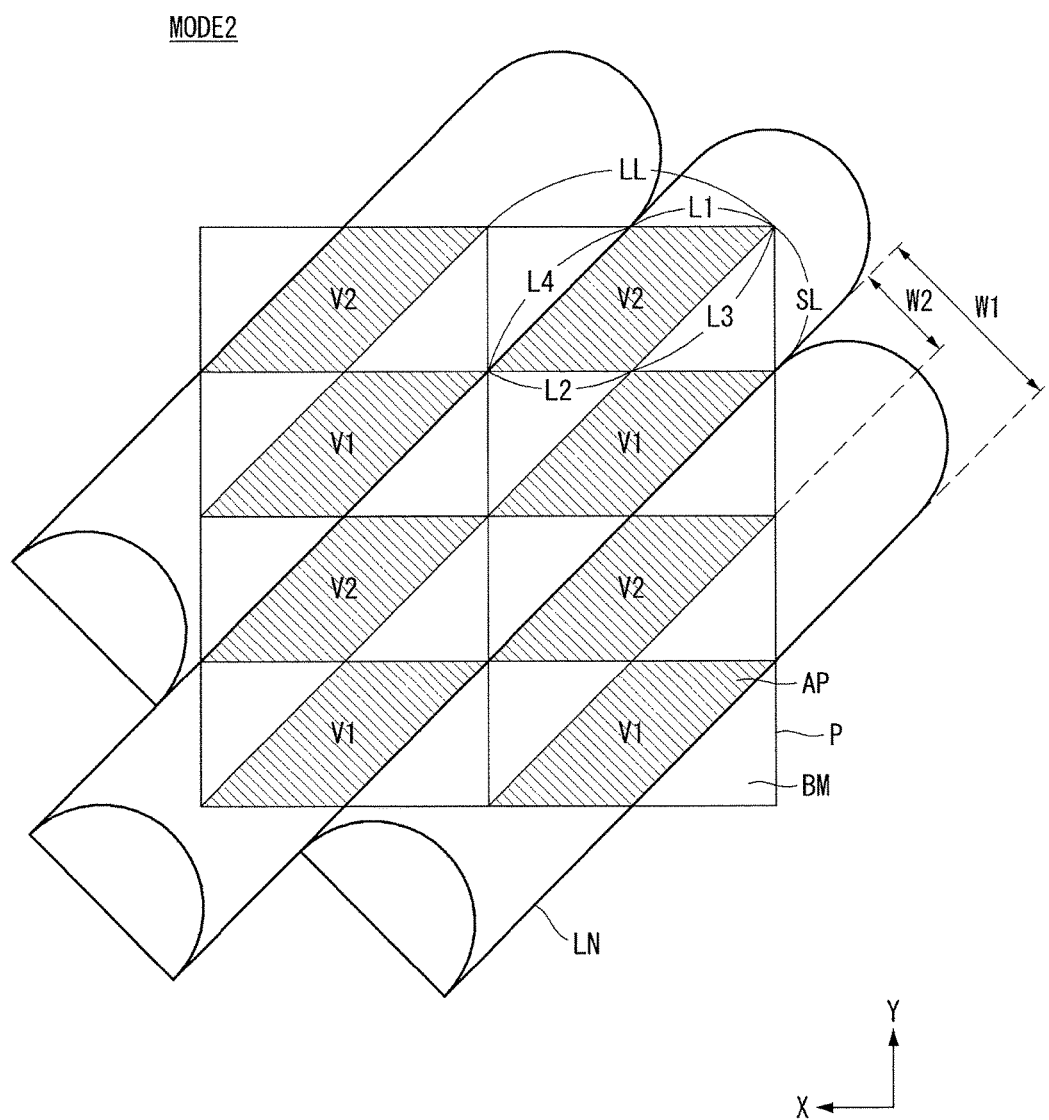
FIG. 7 illustrates a relationship between a display panel and an optical cell in a second mode according to an embodiment of the disclosure.

FIG. 3 is a cross-sectional view schematically illustrating a stereoscopic image display according to an embodiment of the disclosure. FIGS. 4 and 5 illustrate a relationship between a pixel and an aperture according to embodiments. FIG. 6 illustrates a relationship between a display panel and an optical cell in a first mode according to an embodiment of the disclosure. FIG. 7 illustrates a relationship between a display panel and an optical cell in a second mode according to an embodiment of the disclosure.

A stereoscopic image display according to an embodiment of the disclosure can selectively provide a three-dimensional (3D) image of a landscape mode and a portrait mode for a user in response to a pivoting operation of the user. The pivoting operation refers to a series of operations for switching between the landscape mode and the portrait mode. The landscape mode is equivalent to rotating the screen of the portrait mode by 90°. Hereinafter, embodiments of the disclosure are described using that a first mode is the landscape mode and a second mode is the portrait mode as an example. However, embodiments are not limited thereto.

Referring to FIGS. 3 to 5, a stereoscopic image display according to an embodiment of the disclosure includes a display panel 100 and an optical cell 200.

The display panel 100 may be implemented as a display such as a liquid crystal display (LCD), a field emission display (FED), a plasma display panel (PDP), and an organic light emitting diode (OLED) display. Hereinafter, embodiments of the disclosure are described using a display panel of a liquid crystal display as an example of the display panel 100 for the convenience of explanation.

The display panel 100 includes a plurality of pixels P for implementing various colors. The pixels P are arranged in a matrix along the X-axis and Y-axis directions. Each pixel P includes an aperture AP. The aperture AP may be defined as an area implementing a color. For example, the aperture AP may be defined as an area displaying one of red, green, and blue colors, or as an area displaying one of red, green, blue, and white colors. A shape of the aperture AP may be defined by a black matrix BM. In other words, the black matrix BM may be positioned in an area excluding the aperture AP from the pixel P.

The optical cell 200 is disposed on the display panel 100. The optical cell 200 includes a stereoscopic image unit. Thus, the optical cell 200 refracts a left eye image of a 3D image to a left eye of a user and refracts a right eye image of the 3D image to a right eye of the user. The stereoscopic image unit can be defined as an element for separating a parallax image between the user's left and right eyes. The optical cell 200 can be implemented as one of a lenticular sheet, a liquid crystal lens, a parallax barrier, and a switchable barrier. Hereinafter, embodiments of the disclosure are described using a lenticular lens as an example of the stereoscopic image unit.

Each pixel P includes a short side SL and a long side LL. The short side SL is disposed in the X-axis direction, and the long side LL is disposed in the Y-axis direction. A ratio of lengths of the short side SL and the long side LL can be set to 1:2.

The aperture AP is included inside the pixel P and is defined by a first side L1, a second side L2, a third side L3, and a fourth side L4. The first side L1 and the second side L2 are parallel to the long side LL of the pixel P and are spaced apart from each other by a predetermined distance. The third side L3 and the fourth side L4 are inclined from the short side SL and the long side LL of the pixel P by 45° and are spaced apart from each other by a predetermined distance. The aperture AP can have a parallelogram shape. In other words, a major axis of the aperture AP can extend diagonally across the pixel P.

A ratio of lengths of the first side L1 and the long side LL can be set to 1:2, and a ratio of lengths of the second side L2 and the long side LL can be set to 1:2. In other words, a ratio of lengths of the first side L1 and the short side SL can be set to 1:1, and a ratio of lengths of the second side L2 and the short side SL can be set to 1:1.

In a first mode MODE1, the long side LL of the pixel P is disposed in the Y-axis direction, and the short side SL of the pixel P is disposed in the X-axis direction. In a second mode MODE2, the long side LL of the pixel P is disposed in the X-axis direction, and the short side SL of the pixel P is disposed in the Y-axis direction.

As shown in FIG. 6, in the first mode MODE1, lenticular lenses LN are extended in a direction inclined from the short side SL and the long side LL of the pixel P by 45° in parallel with each other. A width W1 of the lenticular lens LN may be determined depending on a width W2 of the aperture AP, a distance E between both eyes, and the number N of views and is expressed by the following Equation 1.

$$w1 = \frac{N}{\frac{1}{w2} + \frac{1}{E}}$$ [Equation 1]

As indicated by the above Equation 1, in the first mode MODE1, the width W1 of the lenticular lens LN corresponds to widths W2 of the apertures AP of the n successively arranged pixels P, where "n" is a natural number equal to or greater than 2. In embodiments disclosed herein, the width W2 of the aperture AP means a distance between the third side L3 and the fourth side L4. For example, as shown in FIG. 6, the width W1 of the lenticular lens LN can be substantially equal to a sum of the widths W2 of the apertures AP of the two successively arranged pixels P. FIG. 6 illustrates the width W1 of the lenticular lens LN based on that the apertures AP displaying a 3D image including first and second views V1 and V2, by way of example. However, embodiments are not limited thereto. For example, when the pixels P display a multi-view image including first to nth views, the width W1 of the lenticular lens LN can be substantially equal to a sum of widths W2 of the apertures AP of the n pixels P displaying the first to nth views.

In the first mode MODE1, the 3D image may include the first and second views V1 and V2. The aperture AP on the left side of the lenticular lens LN may display the second view V2, and the aperture AP on the right side of the lenticular lens LN may display the first view V1. The second view V2 displayed by the aperture AP on the left side of the lenticular lens LN is refracted by the lenticular lens LN and is input to the right eye of the user. The first view V1 displayed by the aperture AP on the right side of the lenticular lens LN is refracted by the lenticular lens LN and is input to the left eye of the user. Thus, the user can view a stereoscopic image by binocular disparity.

As shown in FIG. 7, in the second mode MODE2, the lenticular lenses LN are extended in a direction inclined from the short side SL and the long side LL of the pixel P by 45° in parallel with each other. A width W1 of the lenticular lens LN corresponds to widths W2 of the apertures AP of the n successively arranged pixels P. Thus, the stereoscopic image display, according to the embodiment of the disclosure, can uniformly maintain the width W1 of the lenticular lens LN in the first mode MODE1 and the second mode MODE2.

In the second mode MODE2, the 3D image may include first and second views V1 and V2. The aperture AP on the left side of the lenticular lens LN may display the second view V2, and the aperture AP on the right side of the lenticular lens LN may display the first view V1. The second view V2 displayed by the aperture AP on the left side of the lenticular lens LN is refracted by the lenticular lens LN and is input to the right eye of the user. The first view V1 displayed by the aperture AP on the right side of the lenticular lens LN is refracted by the lenticular lens LN and is input to the left eye of the user. Thus, the user can view a stereoscopic image by binocular disparity.

Because the stereoscopic image display according to the embodiment of the disclosure can equally maintain the width W1 of the lenticular lens LN in the first mode MODE1 and the second mode MODE2, the user can view the stereoscopic image without any changes in an optimal stereoscopic viewing distance even when the user performs a pivoting operation. In other words, a focal length for binocular disparity of the 3D image and an optical viewing distance can be the same in both the landscape mode and the portrait mode. Further, because the stereoscopic image display according to the embodiment of the disclosure can allow the user to view the stereoscopic image without a 3D crosstalk even when the user performs the pivoting operation, the display quality of the stereoscopic image can be improved.

In the stereoscopic image display according to the embodiment of the disclosure, the ratio of lengths of the short side SL and the long side LL of the pixel P is set to 1:2, and the ratios of lengths of each of the first and second sides L1 and L2 of the aperture AP and the long side LL of the pixel P are set to 1:2. Hence, an area occupied by the aperture AP in each pixel P can be sufficiently secured. As a result, embodiments of the disclosure can provide the stereoscopic image display capable of securing a sufficient aperture ratio even in a high-resolution display device in which a unit pixel has a relatively small size.

Figure 8:
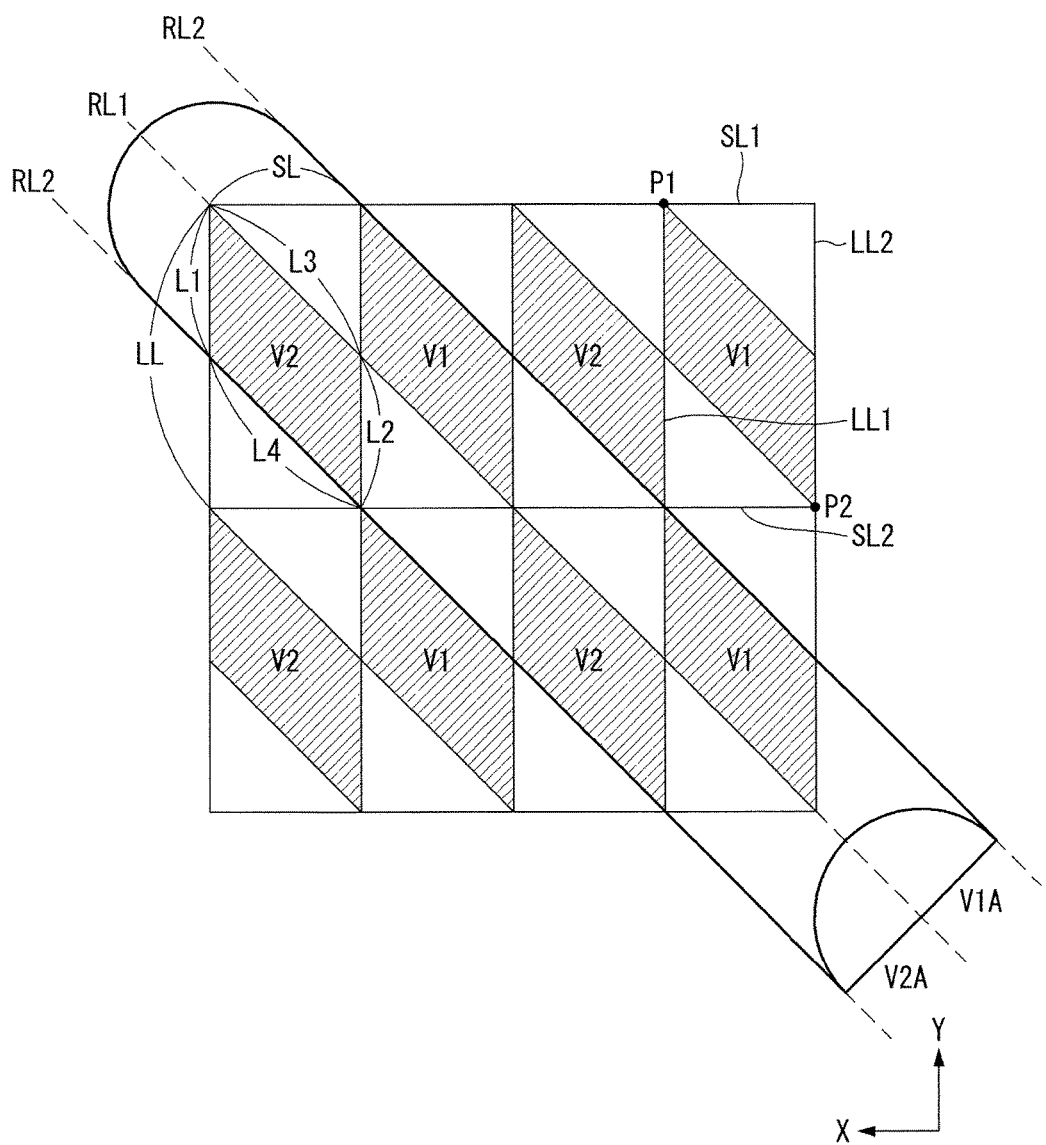
FIGS. 8 and 9 illustrate a relationship between a view area and an aperture distinguished by a lenticular lens according to an embodiment of the disclosure.
Figure 9:
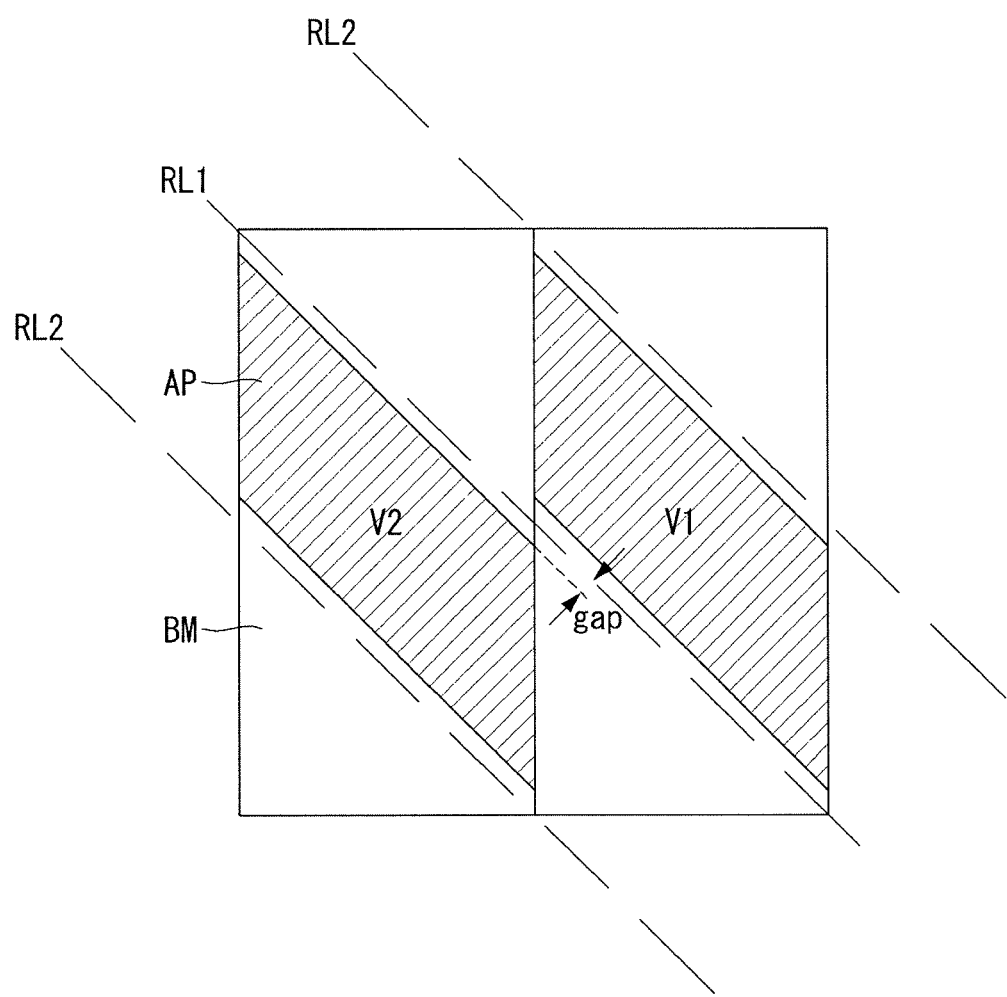

FIGS. 8 and 9 illustrate a relationship between a view area and an aperture distinguished by a lenticular lens.

As shown in FIG. 8, the stereoscopic image display according to the embodiment of the disclosure can include n view areas divided by the lenticular lens LN and displays a previously assigned view image on pixels P corresponding to each view area. For example, a first view V1 and a second view V2 can be respectively provided on a first view area V1A and a second view area V2A. Apertures AP to which an image of the first view V1 is assigned are disposed in the first view area V1A. Apertures AP to which an image of the second view V2 is assigned are disposed in the second view area V2A.

Each pixel P can be defined by a first long side LL1 and a second long side LL2 that are extended in parallel with each other, and a first short side SL1 and a second short side SL2 that are extended in parallel with each other. Each of the view areas V1A and V2A can be defined by the first long side LL1 and the second long side LL2 of the pixel P, a first virtual reference line RL1 (e.g., along a center line of the lenticular lens), and a second virtual reference line RL2 (e.g., along an outer edge of the lenticular lens). Hence, each of the view areas V1A and V2A can have a parallelogram shape.

The first and second reference lines RL1 and RL2 are extended in the same direction as an extension direction of the lenticular lens LN. Namely, the first and second reference lines RL1 and RL2 are extended in a direction inclined from the short side SL and the long side LL of the pixel P by 45° in parallel with each other and are spaced apart from each other by a predetermined distance. The first reference line RL1 passes a first point P1 where the first long side LL1 and the first short side SL1 meet each other and traverses the middle of the second long side LL2. The second reference line RL2 traverses the middle of the first long side LL1 and passes a second point P2 where the second long side LL2 and the second short side SL2 meet each other. In the stereoscopic image display according to the embodiment of the disclosure, the third and fourth sides L3 and L4 of the aperture AP are in contact with the first and second reference lines RL1 and RL2.

As shown in FIG. 9, when the first reference line RL1 does not contact the third and fourth sides L3 and L4 of the apertures AP adjacent to the first reference line RL1 due to a reduction in the width of the aperture AP and is spaced apart from the third and fourth sides L3 and L4 of the apertures AP by a predetermined gap, a bright portion is formed between the view areas V1A and V2A adjacent to the first reference line RL1, thereby leading to a luminance variation in which a luminance sharply increases at a boundary between the view areas V1A and V2A. The luminance variation may be recognized as a bright line to the user and thus may deteriorate the quality of the stereoscopic image.

In order to prevent the luminance variation, the stereoscopic image display according to the embodiment of the disclosure brings the third and fourth sides L3 and L4 of the apertures AP into contact with the first and second reference lines RL1 and RL2. Hence, embodiments of the disclosure can provide the stereoscopic image display with the improved quality of the stereoscopic image by preventing the luminance variation.

As described above, the aperture AP according to the embodiment of the disclosure can be formed inside the pixel P, in which the ratio of lengths of the short side SL and the long side LL is set to 1:2, to satisfy the following conditions.

The following conditions are as follows:

1. A ratio of lengths of the short side SL and the long side LL of the pixel P is set to 1:2.

2. The aperture AP is included inside the pixel P and includes first and second sides L1 and L2 parallel to the long side LL and third and fourth sides L3 and L4 inclined from the short side SL and the long side LL by 45°.

3. A ratio of lengths of the first side L1 and the long side LL is set to 1:2, and a ratio of lengths of the second side L2 and the long side LL is set to 1:2.

4. The third side L3 and the fourth side L4 are respectively overlap with the reference lines RL1 and RL2 defining the view areas V1A and V2A.

Figure 10:
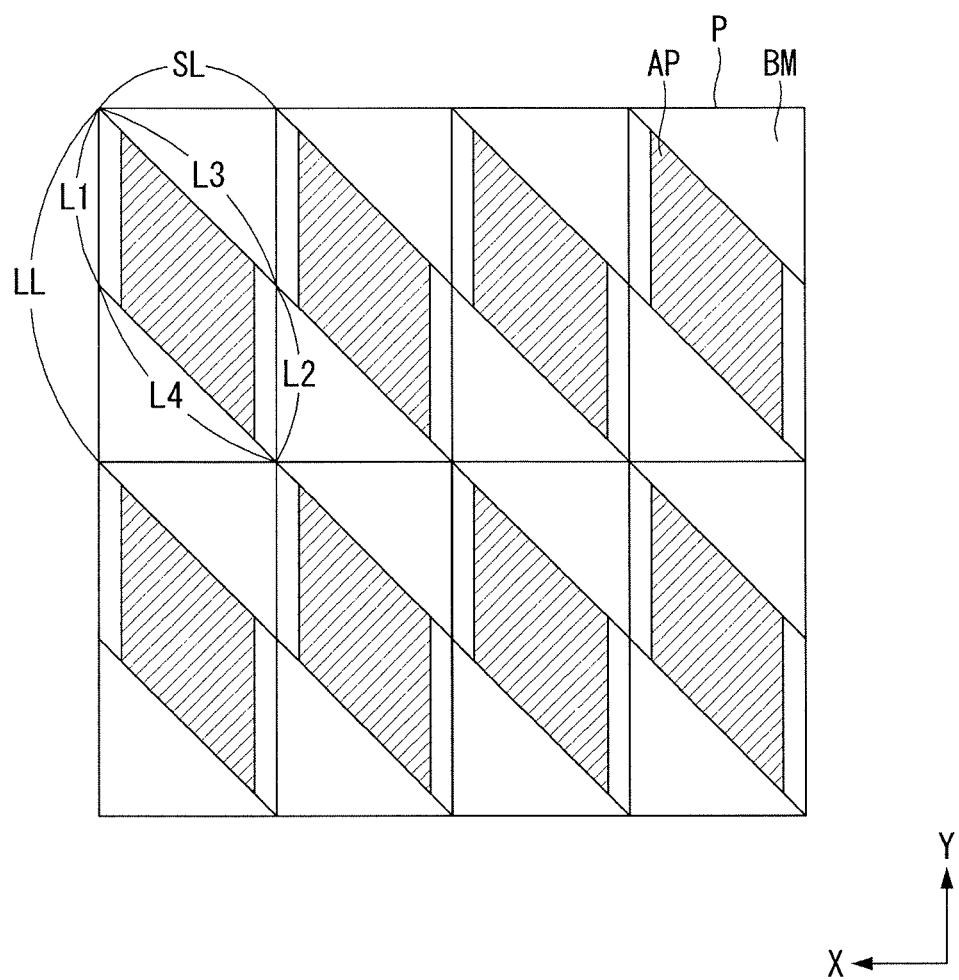
FIG. 10 illustrates a relationship between a pixel and an aperture according to an embodiment of the disclosure.

It suffices that the aperture AP according to the embodiment of the disclosure satisfies the above conditions. Thus, as shown in FIG. 10, the first side L1 and the second side L2 of the aperture AP do not need to contact the long side LL of the pixel P. For example, the first side L1 of the aperture AP can be spaced apart from the first long side LL1 of the pixel P by a predetermined distance, and the second side L2 of the aperture AP can be spaced apart from the second long side LL2 of the pixel P by a predetermined distance. In this regard, the stereoscopic image display according to the embodiment of the disclosure has a design freedom in forming the aperture AP.

Figure 11:
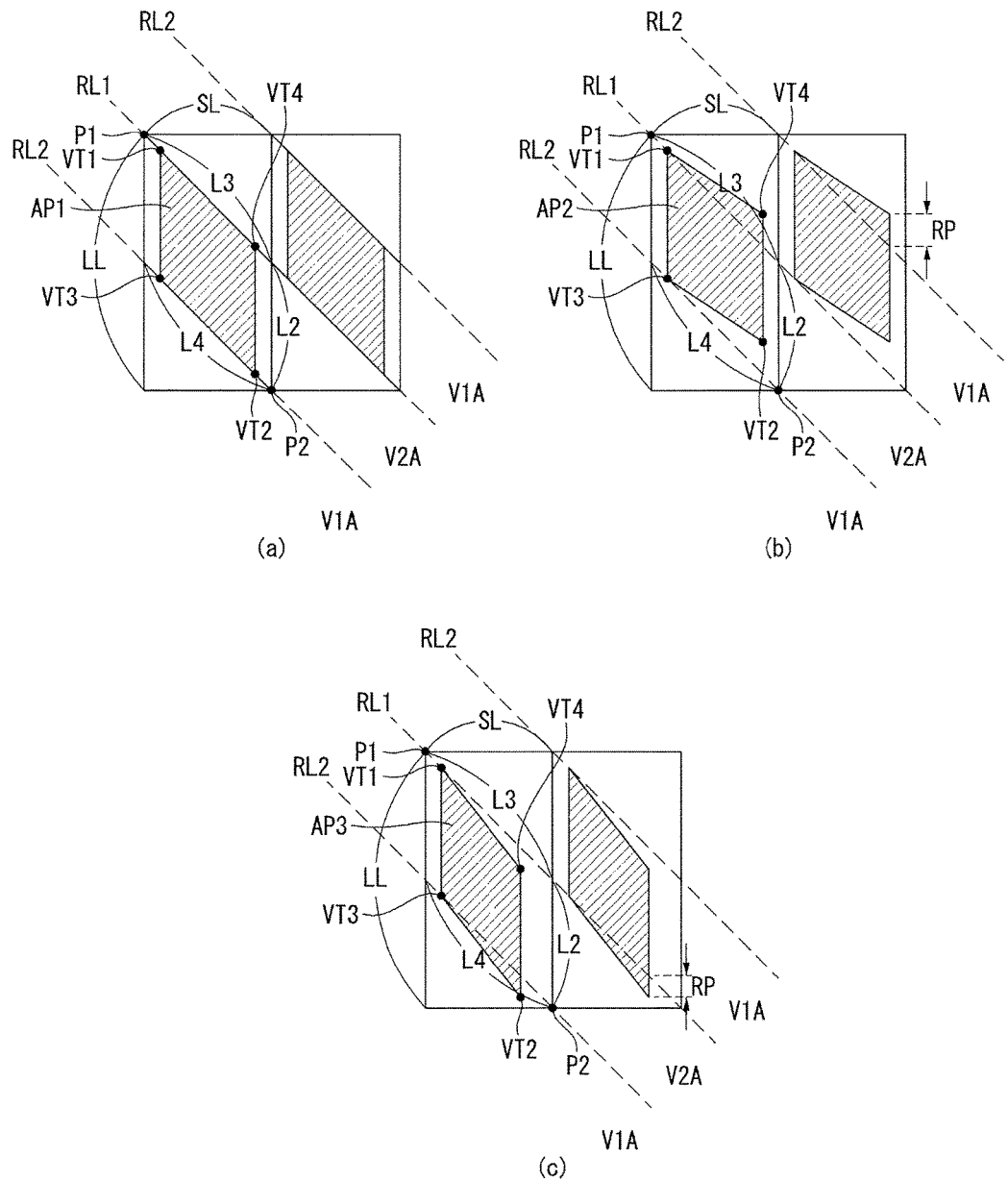
FIG. 11 illustrates a pixel and an aperture according to another embodiment of the disclosure.

A stereoscopic image display according to another embodiment of the disclosure is described below with reference to FIG. 11. FIG. 11 illustrates a pixel and an aperture according to another embodiment of the disclosure.

A stereoscopic image display according to another embodiment of the disclosure can adjust a shape of an aperture, in order to prevent a defect caused by a process variation, for example, the above luminance variation. The shape of the aperture is adjusted on the premise that the following conditions are satisfied.

The following conditions are as follows:

1. A ratio of lengths of a short side SL and a long side LL of a pixel P is set to 1:2.

2. A aperture AP is included inside the pixel P and includes first and second sides L1 and L2 parallel to the long side LL and third and fourth sides L3 and L4 that are inclined from the short side SL and the long side LL by a predetermined angle and are parallel to each other.

3. A ratio of lengths of the first side L1 and the long side LL is set to 1:2, and a ratio of lengths of the second side L2 and the long side LL is set to 1:2.

As shown in (a) of FIG. 11, each pixel P is defined by a first short side SL1 and a second short side SL2 that are extended in a X-axis direction, and a first long side LL1 and a second long side LL2 that are extended in a Y-axis direction. The pixel P has a first point P1 where the first short side SL1 and the first long side LL1 meet each other and a second point P2 where the second short side SL2 and the second long side LL2 meet each other.

An aperture AP1 is included inside the pixel P and is defined by a first side L1, a second side L2, a third side L3, and a fourth side L4. The first side L1 and the second side L2 are parallel to the long sides LL1 and LL2 and are spaced apart from each other. The third side L3 and the fourth side L4 are inclined from the first short side SL1 and the first long side LL1 by a predetermined angle and are spaced apart from each other in parallel with each other. The aperture AP1 has a first vertex VT1 at which the first side L1 and the third side L3 meet each other, a second vertex VT2 at which the second side L2 and the fourth side L4 meet each other, a third vertex VT3 at which the first side L1 and the fourth side L4 meet each other, and a fourth vertex VT4 at which the second side L2 and the third side L3 meet each other.

As shown in (b) and (c) of FIG. 11, another embodiment of the disclosure may be configured so that at least a portion of each of apertures AP2 and AP3 can overlap one of first and second reference lines RL1 and RL2 by artificially adjusting the shape of the aperture AP1. Namely, the shapes of the adjusted apertures AP2 and AP3 can be properly selected in consideration of a process variation while satisfying the above conditions, so that at least a portion of each of the apertures AP2 and AP3 can overlap one of the first and second reference lines RL1 and RL2 even when a process error is generated. The first reference line RL1 is a virtual line that traverses the first point P1 and the middle of the second long side LL2. The second reference line RL2 is a virtual line that traverses the middle of the first long side LL1 and the second point P2.

In order to minimize a 3D crosstalk between view areas V1A and V2A, portions of the adjusted apertures AP2 beyond the reference lines RL1 and RL2 may have as small an area as possible in the process, and portions of the adjusted apertures AP3 beyond the reference lines RL1 and RL2 may have as small an area as possible in the process.

More specifically, the first vertex VT1 and the third vertex VT3 of each of the adjusted apertures AP2 and AP3 are respectively positioned on the first reference line RL1 and the second reference line RL2, and the fourth vertex VT4 and the second vertex VT2 of each of the adjusted apertures AP2 and AP3 are respectively spaced apart from the first reference line RL1 and the second reference line RL2 by a predetermined distance. Thus, the adjusted apertures AP2 and AP3 each overlap one of the first and second reference lines RL1 and RL2.

When a separation distance between the second vertex VT2 and the second reference line RL2 and a separation distance between the fourth vertex VT4 and the first reference line RL1 are denoted by "RP" and a tolerance of the aperture AP required in the process is denoted by "b," a luminance difference LD can be expressed by the following Equation 2.

$$LD = \frac{b}{RP} \qquad \text{[Equation 2]}$$

Accordingly, another embodiment of the disclosure has an advantage of reducing the luminance difference LD by increasing the separation distance RP. However, as described above, the separation distance RP may have as small a value as possible, in order to reduce the 3D crosstalk.

In addition, the fourth vertex VT4 and the second vertex VT2 of each of the adjusted apertures AP2 and AP3 can be respectively positioned on the first reference line RL1 and the second reference line RL2, and the first vertex VT1 and the third vertex VT3 of each of the adjusted apertures AP2 and AP3 can be respectively spaced apart from the first reference line RL1 and the second reference line RL2 by a predetermined distance. In this instance, the adjusted apertures AP2 and AP3 each overlap one of the first and second reference lines RL1 and RL2.

Another embodiment of the disclosure can adjust the shape of the aperture, thereby providing a robust structure capable of minimizing the luminance difference caused by the process error even when the process error is generated.

Figure 12:
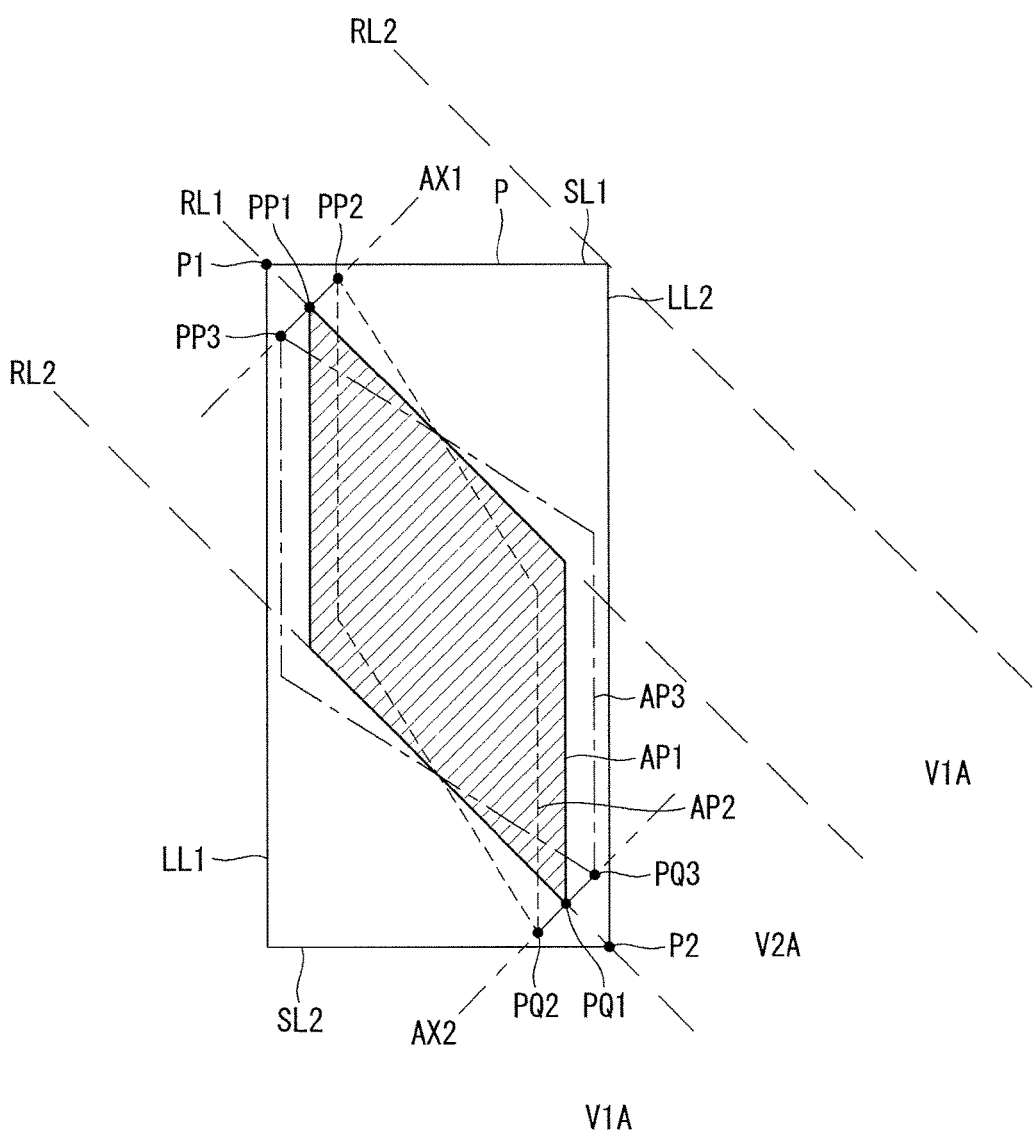
FIG. 12 illustrates a pixel and an aperture according to yet another embodiment of the disclosure.

A stereoscopic image display according to yet another embodiment of the disclosure is described below with reference to FIG. 12. FIG. 12 illustrates a pixel and an aperture according to yet another embodiment of the disclosure.

Referring to FIG. 12, a stereoscopic image display according to yet another embodiment of the disclosure can adjust a shape of an aperture, in order to prevent a defect caused by a process variation, for example, the above luminance variation. The shape of the aperture is adjusted on the premise that the following conditions are satisfied.

The following conditions are as follows:

1. A ratio of lengths of a short side SL and a long side LL of a pixel P is set to 1:2.

2. A aperture AP is included inside the pixel P and includes first and second sides L1 and L2 parallel to the long side LL and third and fourth sides L3 and L4 that are inclined from the short side SL and the long side LL by a predetermined angle and are parallel to each other.

3. A ratio of lengths of the first side L1 and the long side LL is set to 1:2, and a ratio of lengths of the second side L2 and the long side LL is set to 1:2.

4. The third side L3 and the fourth side L4 intersect reference lines RL1 and RL2 defining view areas V1A and V2A.

Yet another embodiment of the disclosure can be configured so that so that at least a portion of each of apertures AP2 and AP3 can contact or overlap the reference lines RL1 and RL2 by artificially adjusting a shape of an aperture AP1. Namely, the shapes of the adjusted apertures AP2 and AP3 can be properly selected in consideration of a process variation while satisfying the above conditions, so that at least a portion of each of the apertures AP2 and AP3 can overlap the reference lines RL1 and RL2 even when a process error is generated. In order to minimize a 3D crosstalk between the view areas V1A and V2A, portions of the adjusted aperture AP2 beyond the reference lines RL1 and RL2 may have as small an area as possible in the process, and portions of the adjusted aperture AP3 beyond the reference lines RL1 and RL2 may have as small an area as possible in the process.

More specifically, each pixel P is defined by a first short side SL1 and a second short side SL2 that are extended in a X-axis direction, and a first long side LL1 and a second long side LL2 that are extended in a Y-axis direction. The pixel P has a first point P1 where the first short side SL1 and the first long side LL1 meet each other and a second point P2 where the second short side SL2 and the second long side LL2 meet each other.

Each of the apertures AP1, AP2, and AP3 is included inside the pixel P and is defined by a first side L1, a second side L2, a third side L3, and a fourth side L4. The first side L1 and the second side L2 are parallel to the long sides LL1 and LL2 and are spaced apart from each other. The third side L3 and the fourth side L4 are inclined from the first short side SL1 and the first long side LL1 by a predetermined angle and are spaced apart from each other in parallel with each other. The apertures AP1, AP2, and AP3 respectively have first vertexes PP1, PP2, and PP3 at which the first side L1 and the third side L3 meet each other, and second vertexes PQ1, PQ2, and PQ3 at which the second side L2 and the fourth side L4 meet each other.

The first vertexes PP1, PP2, and PP3 of the apertures AP1, AP2, and AP3 are positioned on a first tilting line AX1 perpendicular to the first reference line RL1 that traverses the first point P1 and the middle of the second long side LL2. The second vertexes PQ1, PQ2, and PQ3 of the apertures AP1, AP2, and AP3 are positioned on a second tilting line AX2 perpendicular to the second reference line RL2 that traverses the middle of the first long side LL1 and the second point P2. The first tilting line AX1 and the second tilting line AX2 are parallel to each other. Namely, the first vertexes PP2 and PP3 of the adjusted apertures AP2 and AP3 formed by adjusting the shape of the aperture AP1 can be positioned on the first tilting line AX1, and the second vertexes PQ2 and PQ3 of the adjusted apertures AP2 and AP3 can be positioned on the second tilting line AX2.

Assuming a center C of the pixel P, a distance between the first vertexes PP2 and PP3 of the adjusted apertures AP2 and AP3 and the center C of the pixel P can be substantially equal to a distance between the second vertexes PQ2 and PQ3 of the adjusted apertures AP2 and AP3 and the center C of the pixel P. This indicates that portions of the adjusted aperture AP2 beyond the first and second reference lines RL1 and RL2 have the same area and portions of the adjusted aperture AP3 beyond the first and second reference lines RL1 and RL2 have the same area.

Yet another embodiment of the disclosure can adjust the shape of the aperture, thereby providing a robust structure capable of minimizing a luminance difference caused by the process error even when the process error is generated.

Figure 13:
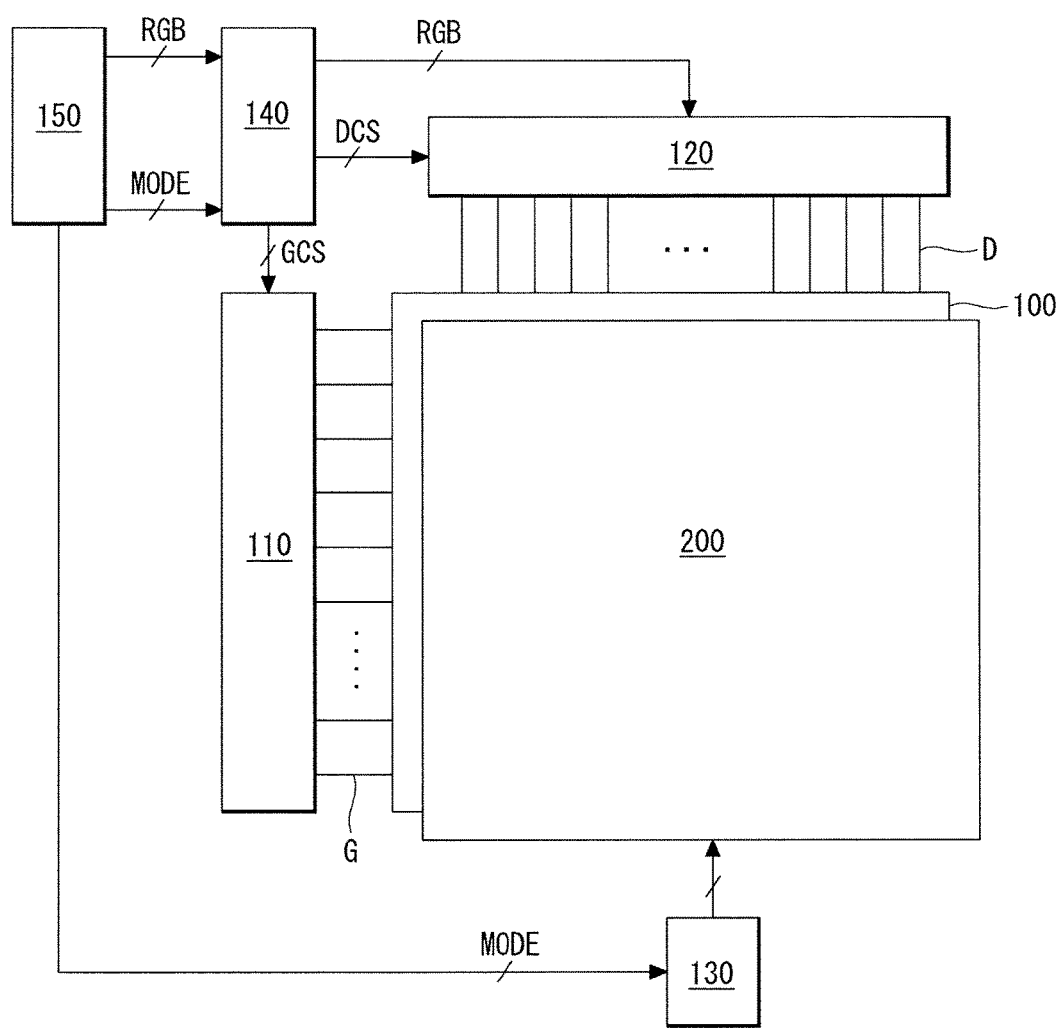
FIG. 13 is a block diagram schematically illustrating a stereoscopic image display according to an embodiment of the disclosure.

FIG. 13 is a block diagram schematically illustrating a stereoscopic image display according to an embodiment of the disclosure.

Referring to FIG. 13, a stereoscopic image display according to an embodiment of the disclosure includes a display panel 100, an optical cell 200, a gate driver 110, a data driver 120, an optical plate driver 130, a timing controller 140, and a host system 150, and the like.

The display panel 100 displays an image under the control of the timing controller 140. The display panel 100 includes data lines D and gate lines G (or referred to as "scan lines") which intersect each other, and thin film transistors (TFTs) disposed in pixels defined by the data lines D and the gate lines G.

A color filter array including black matrixes, color filters, common electrodes, etc. can be formed on an upper substrate of the display panel 100. An upper polarizing plate is attached to the upper substrate of the display panel 100, and a lower polarizing plate is attached to a lower substrate of the display panel 100. A light transmission axis of the upper polarizing plate and a light transmission axis of the lower polarizing plate can be formed to be perpendicular to each other. Alignment layers for setting a pre-tilt angle of liquid crystals are respectively formed on the upper substrate and the lower substrate of the display panel 100. A spacer is formed between the upper substrate and the lower substrate of the display panel 100 to keep a cell gap of liquid crystal cells constant. The common electrode is formed on the upper substrate in a vertical electric field driving manner such as a twisted nematic (TN) mode and a vertical alignment (VA) mode. Alternatively, the common electrode is formed on the lower substrate along with pixel electrodes in a horizontal electric field driving manner such as an in-plane switching (IPS) mode and a fringe field switching (FFS) mode. The display panel 100 may be implemented in any liquid crystal mode including the TN, VA, IPS, and FFS modes. The stereoscopic image display further includes a backlight unit irradiating light onto a back surface of the display panel 100. The backlight unit includes light sources that turns on or off depending on a driving current provided by a backlight driver, a light guide plate (or a diffusion plate), a plurality of optical sheets, and the like.

The display panel 100 displays a two-dimensional (2D) image in a 2D mode and displays a 3D image in a 3D mode under the control of the timing controller 140. The timing controller 140 is configured so that 2D image data is addressed to the display panel 100 in the 2D mode, and is configured so that 3D image data is addressed to the display panel 100 in the 3D mode. The 3D image may be implemented as a multi-view image including first to nth views.

The color filters and the pixels of the display panel 100 can be arranged as shown in FIGS. 3 to 6, in order to allow a user to perform a pivot operation even when the user views a stereoscopic image.

The data driver 120 includes a plurality of source driver integrated circuits (ICs). The source driver ICs receive digital image data RGB from the timing controller 140. The source driver ICs convert the digital image data RGB into positive and negative analog data voltages using positive and negative gamma compensation voltages supplied from a gamma voltage generating circuit. The positive and negative analog data voltages output from the source driver ICs are supplied to the data lines D of the display panel 100. The source driver ICs may be connected to the data lines D of the display panel 100 through a chip-on glass (COG) process or a tape automated bonding (TAB) process.

The gate driver 110 sequentially supplies gate pulses synchronized with the data voltages to the gate lines G of the display panel 100 under the control of the timing controller 140. The gate driver 110 includes a shift register that sequentially shifts a gate start pulse in response to a gate shift clock and outputs the gate start pulse, a level shifter that converts an output signal of the shift register to a signal having a swing width suitable for a TFT drive of the pixel, an output buffer, and the like. The gate driver 110 may be attached to the display panel 100 through the TAB process, or may be formed on the lower substrate of the display panel 100 through a gate-in panel (GIP) process. In the GIP process, the level shifter may be mounted on a printed circuit board (PCB), and the shift register may be formed on the lower substrate of the display panel 100.

The timing controller 140 drives the display panel 100 at a predetermined frame frequency based on the digital image data RGB and timing signals received from the host system 150 and can generate a gate driver control signal GCS and a data driver control signal DCS based on the predetermined frame frequency. The timing signals include a vertical sync signal, a horizontal sync signal, a data enable signal, a dot clock, and the like. The timing controller 140 supplies the gate driver control signal GCS to the gate driver 110 and supplies the digital image data RGB and the data driver control signal DCS to the data driver 120.

The gate driver control signal GCS includes a gate start pulse, a gate shift clock, a gate output enable signal, and the like. The gate start pulse controls timing of a first gate pulse. The gate shift clock is a clock signal for shifting the gate start pulse. The gate output enable signal controls an output timing of the gate driver 110. The data driver control signal DCS includes a source start pulse, a source sampling clock, a polarity control signal, a source output enable signal, and the like. The source start pulse controls a data sampling start time of the data driver 120. The source sampling clock is a clock signal for controlling a sampling operation of the data driver 120 based on its rising or falling edge. If the digital image data RGB to be input to the data driver 120 is transmitted in a mini low voltage differential signaling (LVDS) interface standard, the source start pulse and the source sampling clock may be omitted. The polarity control signal inverts a polarity of the data voltage output from the data driver 120 every L horizontal periods, where L is a natural numeral. The source output enable signal controls an output timing of the data driver 120.

The host system 150 supplies the digital image data RGB and the timing signals to the timing controller 140 through an LVDS interface, a transition minimized differential signaling (TMDS) interface, etc. In the 2D mode, the host system 150 supplies the 2D image data received from the outside to the timing controller 140. In the 3D mode, the host system 150 supplies multi-view image data including the first to nth views to the timing controller 140. Further, the host system 150 supplies a mode signal MODE, that can determine whether it is the 2D mode or the 3D mode, to an optical plate driver 130 and the timing controller 140. The mode signal MODE can be generated as a signal of a low logic level in the 2D mode and may be generated as a signal of a high logic level in the 3D mode. However, embodiments are not limited thereto.

Although aspects have been described with reference to a number of illustrative aspects thereof, it should be understood that numerous other modifications and aspects can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display comprising:
   a display panel; and
   an optical cell on the display panel,
   wherein the display panel includes:
   a plurality of pixels, each pixel among the plurality of pixels defined by first and second short sides extended in a first direction, and first and second long sides extended in a second direction perpendicular to the first direction; and
   a plurality of apertures disposed in the plurality of pixels, respectively, each aperture among the plurality of apertures defined by first and second sides parallel to the first long side, and third and fourth sides parallel to each other,
   wherein the third side is inclined from the first short side with a first predetermined angle between the first short side and the third side,
   wherein the fourth side is inclined from the first long side with a second predetermined angle between the first long side and the fourth side,
   wherein a ratio of a length of the first short side to a length of the first long side is 1:2,
   wherein a ratio of a length of the first side to the length of the first long side is 1:2, and a ratio of a length of the second side to the length of the first long side is 1:2,
   wherein in a first mode, the first and second short sides are arranged in the first direction, and the first and second long sides are arranged in the second direction,
   wherein in a second mode, the first and second long sides are arranged in the first direction, and the first and second short sides are arranged in the second direction, and
   wherein an optimal viewing distance of a stereoscopic image is the same in the first mode and the second mode.

2. The stereoscopic image display of claim 1, wherein the first predetermined angle and the second predetermined angle are both 45.degree.

3. The stereoscopic image display of claim 1, wherein the first predetermined angle is different than the second predetermined angle.

4. The stereoscopic image display of claim 1, wherein each pixel includes a first point where the first short side meets the first long side meet and a second point where the second short side meets the second long side, wherein the third side overlaps with a first reference line extending through the first point and a middle of the second long side, and wherein the fourth side overlaps with a second reference line extending through a middle of the first long side and the second point.

5. The stereoscopic image display of claim 4, wherein the optical cell includes a stereoscopic image unit that is extended in a same direction as the first reference line and the second reference line.

6. The stereoscopic image display of claim 5, wherein a center line of the stereoscopic image unit corresponds to the first reference line and an outer edge of the stereoscopic unit corresponds to the second reference line.

7. The stereoscopic image display of claim 5, wherein the stereoscopic image unit is extended in parallel with the third and fourth sides and has a width corresponding to widths of n successively arranged apertures, wherein "n" is a natural number equal to or greater than 2, and wherein the width of the aperture equals a distance between the third side and the fourth side.

8. The stereoscopic image display of claim 4, wherein each aperture among the plurality of apertures includes: a first vertex where the first side meets the third side; a second vertex where the second side meets the fourth side; a third vertex where the first side meets the fourth side; and a fourth vertex where the second side meets the third side, wherein the first vertex overlaps with the first reference line, wherein the third vertex overlaps with the second reference line, and wherein the fourth vertex and the second vertex are respectively spaced apart from the first reference line and the second reference line by a same distance.

9. The stereoscopic image display of claim 4, wherein each aperture among the plurality of apertures includes: a first vertex where the first side meets the third side; a second vertex where the second side meets the fourth side meet; a third vertex where the first side meets the fourth side; and a fourth vertex where the second side meets the third side, wherein the fourth vertex overlaps with the first reference line, wherein the second vertex overlaps with the second reference line, and wherein the first vertex and the third vertex are respectively spaced apart from the first reference line and the second reference line by a same distance.

10. The stereoscopic image display of claim 4, wherein each aperture among the plurality of apertures includes a first vertex where the first side meets the third side and a second vertex where the second side meets the fourth side, wherein the first vertex is positioned on a first tilting line perpendicular to the first reference line, and wherein the second vertex is positioned on a second tilting line perpendicular to the second reference line.

11. The stereoscopic image display of claim 10, wherein a distance between the first vertex and a center of the pixel is equal to a distance between the second vertex and the center of the pixel.

12. The stereoscopic image display of claim 10, wherein first and second portions of the aperture respectively extending beyond the first and second reference lines have a same area.

13. The stereoscopic image display of claim 1, wherein the first long side is spaced apart from the first side by a predetermined distance, and wherein the second long side is spaced apart from the second side by a predetermined distance.

14. The stereoscopic image display of claim 1, wherein the optical cell includes a lenticular sheet, a liquid crystal lens, a parallax barrier or a switchable barrier.

15. A stereoscopic image display comprising:
an optical cell including a lenticular sheet, a liquid crystal lens, a parallax barrier or a switchable barrier; and
a display panel including:
a first pixel including first and second short sides extended in a first direction, first and second long sides extended in a second direction perpendicular to the first direction, and a first aperture including first and second sides parallel to the first long side and third and fourth sides parallel to each other, and
a second pixel including first and second short sides extended in a first direction, first and second long sides extended in a second direction perpendicular to the first direction, and a second aperture including first and second sides parallel to the first long side and third and fourth sides parallel to each other,
wherein a first major axis of the first aperture extends diagonally across the first pixel,
wherein a second major axis of the second aperture extends diagonally across the second pixel,
wherein an area of the first aperture is smaller than an area of the first pixel, and an area of the second aperture is smaller than an area of the second pixel,
wherein the optical cell and the display panel are configured to display a three-dimensional (3D) image having a first focal length in a landscape view,
wherein the optical cell and the display panel are configured to display the 3D image having a second focal length in a portrait view, and
wherein the first focal length in the landscape view is substantially equal to the second focal length in the portrait view.

16. The stereoscopic image display of claim 15, wherein the third side is inclined from the first short side with a first predetermined angle between the first short side and the third side, wherein the fourth side is inclined from the first long side with a second predetermined angle between the first long side and the fourth side, wherein a ratio of a length of the first short side to a length of the first long side is 1:2, and wherein a ratio of a length of the first side to a length of the first long side is 1:2, and a ratio of a length of the second side to a length of the first long side is 1:2.

17. A stereoscopic image display comprising:
an optical cell including a lenticular sheet, a liquid crystal lens, a parallax barrier or a switchable barrier; and
a display panel including:
a first pixel including first and second short sides extended in a first direction, first and second long sides extended in a second direction perpendicular to the first direction, and a first aperture including first and second sides parallel to the first long side and third and fourth sides parallel to each other, and
a second pixel including first and second short sides extended in a first direction, first and second long sides extended in a second direction perpendicular to the first direction, and a second aperture including first and second sides parallel to the first long side and third and fourth sides parallel to each other,
wherein a first major axis of the first aperture extends diagonally across the first pixel,
wherein a second major axis of the second aperture extends diagonally across the second pixel,
wherein the optical cell and the display panel are configured to display a three-dimensional (3D) image in a landscape view,
wherein the optical cell and the display panel are configured to display the 3D image in a portrait view, and
wherein an optimal viewing distance of the 3D is the same in the landscape view and the portrait view.

18. The stereoscopic image display of claim 17, wherein the third side is inclined from the first short side with a first predetermined angle between the first short side and the third side, wherein the fourth side is inclined from the first long side with a second predetermined angle between the first long side and the fourth side, wherein a ratio of a length of the first short side to a length of the first long side is 1:2, and wherein a ratio of a length of the first side to a length of the first long side is 1:2, and a ratio of a length of the second side to a length of the first long side is 1:2.

* * * * *